United States Patent [19]

Farrar et al.

[11] Patent Number: 4,946,605
[45] Date of Patent: * Aug. 7, 1990

[54] AQUEOUS DRILLING AND PACKER FLUIDS

[75] Inventors: David Farrar; Brian Dymond, both of Bradford, England

[73] Assignee: Allied Colloids Ltd., United Kingdom

[ * ] Notice: The portion of the term of this patent subsequent to Jun. 23, 2004 has been disclaimed.

[21] Appl. No.: 64,815

[22] Filed: Jun. 19, 1987

Related U.S. Application Data

[63] Continuation-in-part of Ser. No. 761,953, Aug. 2, 1985, Pat. No. 4,675,119, which is a continuation-in-part of Ser. No. 641,901, Aug. 20, 1984, abandoned, which is a continuation-in-part of Ser. No. 672,308, Nov. 16, 1984, Pat. No. 4,554,307, which is a continuation-in-part of Ser. No. 612,516, May 21, 1984, Pat. No. 4,507,422.

[30] Foreign Application Priority Data

Aug. 3, 1984 [GB] United Kingdom ................. 8419805

[51] Int. Cl.$^5$ ................................................. C09K 7/02
[52] U.S. Cl. ................................ 252/8.514; 252/8.51; 252/8.513
[58] Field of Search ............................. 252/8.51, 8.514

[56] References Cited

U.S. PATENT DOCUMENTS

| | | | |
|---|---|---|---|
| 2,911,365 | 11/1959 | Burland et al. | 252/8.51 X |
| 2,913,437 | 11/1959 | Johnson | 252/8.51 X |
| 3,134,686 | 5/1964 | Baechtold | 525/154 X |
| 3,203,938 | 8/1965 | Baechtold | 252/8.51 X |
| 3,730,900 | 5/1973 | Perricone et al. | 52/8.51 X |
| 3,898,037 | 8/1975 | Langee et al. | 252/391 X |
| 4,293,427 | 10/1981 | Lucas et al. | 252/8.51 X |
| 4,450,013 | 5/1984 | Hirsch et al. | 166/308 N |
| 4,451,628 | 5/1984 | Dammann | 526/307.6 X |
| 4,476,029 | 10/1984 | Sy | 252/8.51 |
| 4,502,964 | 3/1985 | Giddings et al. | 252/8.51 X |
| 4,502,965 | 3/1985 | Giddings | 252/8.51 X |
| 4,507,422 | 3/1985 | Farrar et al. | 524/447 X |
| 4,675,119 | 6/1987 | Farrar et al. | 252/8.514 |
| 4,680,128 | 7/1987 | Portnoy | 252/8.51 X |

FOREIGN PATENT DOCUMENTS 0108842 5/1984 European Pat. Off. .
2070108 9/1981 United Kingdom .

OTHER PUBLICATIONS

"Composition and Properties of Oil Well Drilling Fluids", Fourth Edition, by George R. Gray, H. C. H. Darley and Walter F. Rogers, pp. 138-150.

Primary Examiner—John S. Maples
Assistant Examiner—Gary L. Geist
Attorney, Agent, or Firm—Ostrolenk, Faber, Gerb & Soffen

[57] ABSTRACT

Sulfonated polymers and copolymers are used as thinners in aqueous drilling or packer fluids. The sulfonated polymer has polydispersity below 2 and has a low solution viscosity. It is generally a copolymer of beta-arylamidoalkane sulfonate or allyl sulfonate or other aliphatic sulfonate with an ethylenically unsaturated carboxylic acid, generally acrylic acid.

8 Claims, No Drawings

AQUEOUS DRILLING AND PACKER FLUIDS

This application is a continuation in part of U.S. Ser. No. 761,953 filed 2nd August 1985 (now U.S. Pat. No. 4,675,119) which is a continuation in part of U.S. Ser. No. 641,901 filed 20th August 1984 (now abandoned), U.S. Ser. No. 672,308 filed 16th November 1984 (now U.S. Pat. No. 4,554,307) and U.S. Ser. No. 612,516 filed 21st May 1984 (now U.S. Pat. No. 4,507,422).

Aqueous drilling and packer fluids consist of an aqueous phase in which inorganic particulate material is or may be dispersed and that usually contains dissolved organic additives. The inorganic particulate material often includes a colloidal clay such as bentonite and, during use, drill cuttings. The organic additives will be selected having regard to the properties required of the drilling or packer fluid. They generally fall into three classes. One class of additives are thinners, gel preventers or dispersants, and these serve to reduce viscosity or prevent undesirable increases in viscosity, such as those caused by an increase in suspended solid, coagulation by intrusion of inorganic salts such as sodium chloride or hydroxide or polyvalent metal ions, temperature effects on pre-hydrated bentonite and thermal degradation of other organic additives in the fluid.

Another class of additives are those known as fluid loss additives or filtration control agents. These are intended to promote the formation of a filter cake downhole or influence its permeability. The materials used as fluid loss additives are different from those used as thinners and different materials are required to achieve the different properties. A third class are viscosifiers.

Fluid loss additives are usually relatively high molecular weight water soluble polymers that may be cross-linked to increase their effectiveness. Solutions of the polymer will have a high viscosity. In U.S. Pat. specification No. 4,293,427 it is proposed to use optionally cross-linked copolymers of acrylamide and acrylamido alkyl sulphonic acid for this purpose. In U.S. Pat. specification No. 4,309,523, it is proposed to use copolymers of 2-acrylamido-2-methylpropane-sulphonic acid (AMPS, trade mark) with a N-vinyl-N-methyl acetamide and optionally acrylamide. In PCT patent publication W083/02449, copolymers of AMPS and vinylimidazole and a cross-linking agent are desribed as fluid loss additives. The relatively high molecular weight of such polymers is indicated by the viscosities mentioned in U.S. Pat. No. 4,293,427 and by the relatively high K values in U.S. Pat. No. 4,309,523 and PCT W083/02449.

In U.S. Pat. No. 4,502,964, fluid loss additives are described which are copolymers of at least 51 mole percent AMPS together with dimethyl acrylamide and acrylonitrile. They are said to have molecular weights up to 1 million, preferably up to 500,000, and the example shows a solution having a Brookfield viscosity of 96,000 cps. It is stated that the molecular weight may be down to 10,000, but molecular weights as low as this are unlikely to provide fluid loss properties even when the polymer does contain significant amounts of acrylonitrile. A similar disclosure exists in U.S Pat. No. 4,502,965 except that the exemplified Brookfield viscosity is 2,940 cps and the dimethyl acrylamide is replaced by vinyl pyrrolidone.

In U.S. Pat. No. 4,451,628 there are described copolymers of methallyl sulphonate with acrylic acid which are said to be of use as oil well drilling additives, dispersants and the like and which are said to be of low molecular weight. This is defined as 10,000 to 2 million and the values quoted in the examples range from 160,000 to above 1 million.

Solutions of fluid loss additives must have a relatively high viscosity and/or promote filter cake formation of the mud. Thinners however have to maintain very low viscosity in a liquid containing colloidal clay and, frequently, a weighting agent and drilled rock particles, and which may also contain dissolved calcium and may be exposed to elevated temperatures for prolonged periods. The thinners must serve as dispersants for the clay and other particles and they must inhibit gelling of the drilling or packer fluid.

Synthetic polymers that will act as dispersants are well known. For instance, low molecular weight sodium polyacrylates have been widely used, typically having molecular weights up to 10,000 or more. In U.S. Pat. No. 3,898,037, copolymers of AMPS with acrylic acid or other monomers are proposed and are said to have molecular weight ranges preferably from 10,000 to 100,000 although they can be higher or lower. Polydispersity is weight average molecular weight divided by number average molecular weight and is an indication of the spread of molecular weights within a polymer, a polydispersity of 1 being the theoretical optimum where all polymer chains have the same molecular weight. It is apparent that the polydispersity values of the polymers in U.S. Pat. No. 3,898,037 will inevitably be very high, probably above 3 (see Sample N below). Most of the exemplified polymers contain 70% by weight AMPS but some have only 30% and silt dispersions are amongst the dispersions described in U.S. Pat. No. 3,898,037 but the colloidal fractions of such materials are removed before forming the dispersion.

Copolymers of AMPS with acrylic acid are also described for forming dispersions of non-colloidal material in U.S. Pat. No. 4,450,013 and EP 0108842.

Although thinners for drilling and packer fluids must be dispersants, they must also meet various other performance requirements in order that they are suitable as downhole thinners and there have been numerous publications in the literature of suitable thinning systems. For instance, in U.S. Pat. No. 2,911,365 and U.S. Pat. No. 4,476,029 various polyacrylates are used and in U.S. Pat. No. 2,913,437 olefin maleic anhydride copolymers are used. Generally the molecular weight of thinners is lower than the values that are preferred as dispersants in U.S. Pat. No. 3,898,037.

In U.S. Pat. No. 3,730,900, it is proposed to use styrene sulphonic acid maleic anhydride copolymers having molecular weights between 1,000 and 5,000. Such products have been used extensively under the trade name "Miltemp". In U.S. Pat. specification No. 3,764,530 and in British patent specification 2,120,708, it is proposed to use various acrylic acid polymers. In British patent specification 2,090,888, it is proposed to use a copolymer of acrylic acid and hydroxypropyl acrylate.

In U.S. Pat. No. 4,048,077, it is proposed to add relatively high molecular weight (as indicated by K value) copolymers of, for instance, vinyl sulphonic acid, acrylamide and N-vinyl-N-methyl acetamide to drilling fluid for an unspecified purpose. The effectiveness of these additives was determined by measuring water loss and so presumably they are intended as fluid loss additives. It was stated that the presence of sulpho, amide, nitrile and ester groups increase the stability of the polymers towards calcium ions but the formation of caboxyl groups increases the sensitivity of the polymers to calcium ions.

Low molecular weight polyacrylic acid and low molecular weight styrene sulphonic acid maleic anhydride copolymers are reasonably satisfactory as thinners in many drilling and packer fluids. However they do not always maintain the quality of dispersion that is required in deep wells and, in particular, problems arise when the fluid has a high content of dissolved calcium, for instance when the drilling fluid is a gypsum or lime mud or a mud contaminated with cement or anhydrite.

We have now found that improved results can be obtained in drilling and packer fluids, particularly in those containing substantial quantities of dissolved calcium, if the fluid contains, as thinner, a water soluble polymer having a viscosity (Brookfield Viscometer, Model RVT, Spindle No. 1, speed 20 rpm 15% by weight active polymer solution at 20° C.) of below 300 cps and a polydispersity below 2.0 and formed of (a) 1 to 100% by weight ethylenically unsaturated compound having a sulphonate group substituted onto an aliphatic carbon atom, (b) 0 to 99% by weight ethylenically unsaturated carboxylate and (c) 0 to 20% by weight non-deleterious, inert ethylenically unsaturated monomer. The sulphonate and carboxylate groups may be present as free acid groups or as water soluble salts, for instance amonium or sodium or other alkali metal salts.

The thinner used in the invention must have a Brookfield viscosity of below 300 cps when measured as defined above. Preferably the polymer has a Brookfield viscosity below 100 and mot preferably below 50 cps. Best results are generally obtained at 1 to 20 cps. If the Brookfield viscosity is significantly above these values, the polymer will not act as a thinner but may instead tend to serve as a fluid loss additive.

The low viscosity value results, at least in part, from the molecular weight of the polymer. If the molecular weight is too high, the viscosity will be too high and the polymer will not serve as a thinner. The molecular weight must always be below 50,000 and usually below 20,000 and normally below 10,000. It is normally above 500.

The molecular weight is preferably in the range 1,000 to 8,000, most preferably 1,000 to 6,000. Best results are generally obtained with molecular weights in the range 2,000 to 4,500. Polymers having these molecular weights of below 10,000, preferably below 8,000 and most preferably below 4,500 are of particular value when the drilling or packer fluid is based on freshwater, optionally with dissolved calcium.

It is essential that the polydispersity of the polymer should be below about 2 and so conventional, high polydispersity, polymers such as those proposed as dispersants in U.S. Pat. No. 3,898,037 and as thinners in U.S. Pat. No. 3,730,900 (typically having polydispersities of 2.5, 3 or more) are less satisfactory. The polydispersity must be below about 2 and is preferably below about 1.8. It can be as low as 1.05 but it is generally satisfactory to use polymers having polydispersities of, typically, 1, 0.35 to 1.6. Particularly good results are obtained when the polydispersity is below 1.5.

Monomer (a) must have the sulphonate group substituted on to an aliphatic carbon as substitution on to an aromatic carbon, for instance as in styrene sulphonate, appears to be unsatisfactory. Generally the monomer is aliphatic and may be selected from allyl sulphonate, methallyl sulphonate, vinyl sulphonate, sulphonated alkyl vinyl ester and, preferably, beta-acrylamidoalkane sulphonates such as AMPS and APPS (wherein the methyl of AMPS is replaced by phenyl). The preferred monomers are AMPS and allyl sulphonic acid (both usually as the sodium salt).

The ethylenically unsaturated carboxylic acid (b) may be, for instance, maleic acid, itaconic acid, methacrylic acid or, preferably, acrylic acid.

The comonomer (c) can be any monomer that will copolymerise with monomers (a) and (b) and whose presence is not deleterious to the copolymer. Examples are acrylamide, methacrylamide, and methyl acrylate.

All the monomers used for making the polymers are preferably water soluble.

The monomers from which the polymers are formed generally consist essentially of monomer (a) alone or monomers (a) and (b) and so it is generally unnecessary for monomer (c) to be present. Preferably it is absent but, if present, the amount is preferably below 10%, and mot preferably below 5% by weight. The presence of large amounts of, for instance, acrylonitrile or other copolymers as proposed in, for instance, the fluid loss additives of U.S. Pat. No. 4,502,964 and U.S. Pat. No. 4,502,965 is undesirable in the present invention since it impairs the thinning and dispersing properties of the polymers.

It is generally necessary that at least 10% by weight of the monomers should be sulphonate monomers. It is generally preferred that monomer (b) is present, so that the polymer is a copolymer, with amounts of 10 to 60% (a) and 40 to 90% (b) generally being preferred. Best results are generally obtained in the range 10 to 50% by weight (a) and 50 to 90% by weight (b). Generally the amount of (a) is below 45%. If the objective is cost effectiveness, then the preferred ratios are up to 29% (e.g., 18 to 29%) (a) and down to 71% (e.g., 71 to 82%) (b) but if the objective is maximum stability to the presence of dissolved calcium, irrespective of extra polymer cost, the preferred ratios are 30 to 45% (a) and 70 to 55% (b). Generally it is best for the amount of sulphonate monomer to be below 25%, often 10 to 22%, by weight. For instance particular good results are obtained using 15 to 25 often 18 to 22% by weight AMPS or 7 to 25, often 7 to 18% but sometimes 18 to 22% by weight allyl sulphonate (both as sodium salt), generally copolymerised with acrylic acid.

The preferred copolymers, especially for freshwater fluids, are copolymers of AMPS or allyl sulphonic acid with acrylic acid within these ranges and having a molecular weight preferably in the range about 1,000 to about 8,000, preferably 1,000 to 6,000 and a polydispersity below about 2, generally below about 1.8, preferably in the range 1.35 to 1.6.

The homopolymers and copolymers used in the invention can readily be made by conventional processes known for polymerising water soluble monomers to form low molecular weight, low polydispersity, water soluble polymers, for instance solution polymerisation under controlled temperature conditions in a solvent consisting of water and isopropanol. The manufacture of water soluble dispersant polymers having low polydispersity is described n U.S. Pat. No. 4,507,422 and techniques such as those described therein may be used for producing the polymers that are preferred for use in the present invention.

The specified polymer should be present in an effective thinning amount, which is usually 0.5 to 30 g/l most preferably 0.5 to 3 g/l. It may be used in combination with another thinner, for instance a lignosulphonate thinner, but preferably is the only thinner in the fluid, especially when the fluid is a freshwater fluid.

The fluid, as is customary in drilling and packer fluids, contains colloidal clay generally in an amount of at least about 25 g/l preferably 25 to 150 g/l.

Other inorganic particulate material that is dispersed in the fluid, if present, generally consists essentially only of a weighting agent (such as barites or other conventional weighting agent) and drilled rock particles that are being carried by the fluid. The amount of weighting agent is generally at least 100 g/l. It is generally below 1,000 g/l.

The fluid may contain other components that are conventional in drilling and packer fluids, for instance fluid loss additives and other conventional dissolved organic additives.

The invention is of particular value when the fluid contains dissolved calcium, for instance as a result of dissolving it from rock that is being drilled using the fluid. The amount of calcium in the fluid is often at least about 0.25 gram dissolved calcium per liter of fluid, typically at least 0.5, (e.g., up to 10 g/l). For instance, the fluid may contain 2 to 30 g/l calcium hydroxide or sulphate or other calcium compound that can contribute dissolved calcium.

The following are examples of the invention.

EXAMPLE 1

A weighted freshwater gypsum mud was formulated from 70 g/l pre-hydrated Wyoming bentonite, 630 g/l barites and 11.5 g/l gypsum. Various amounts of different thinners were added. Thinner A was sodium polyacrylate having molecular weight in the range 2,000 to 3,000. Thinner B is a copolymer of 20 weight percent AMPS sodium salt and 80 weight percent sodium acrylate having polydispersity 1.5 and molecular weight about 3,800. Thinner C is a copolymer of 40 weight percent AMPS sodium salt and 60 weight percent sodium acrylate, having polydispersity 1.46 and molecular weight about 3,250. Thinner D is ferro-chrome lignosulphonate. Thinners B and C have Brookfield viscosity (measured as stated above) of below 20 cps.

Reduction in shear thinning rheology is exemplified by yield point (YP) values derived from viscosity measurements using a Fann Model 35SA viscometer. In the following table, the YP values and the 10 second gel values are both quoted in Pa and the dosage is quoted in g/l.

TABLE 1

| Thinner | Dosage | YP | 10 Second Gel |
|---|---|---|---|
| None | 0 | 18 | 14 |
| A | 0.57 | 13 | 11 |
| A | 1.14 | 7 | 9 |
| A | 2.28 | 4 | 5 |
| A | 3.42 | 3 | 2 |
| A | 5.7 | 3 | 2 |
| B | 0.57 | 9 | 6 |
| B | 1.14 | 4 | 3 |
| B | 2.28 | 1 | 1 |
| B | 2.85 | 1 | 1 |
| C | 0.57 | 9 | 6 |
| C | 1.14 | 3 | 2 |
| C | 2.28 | 1 | 1 |
| C | 2.85 | 1 | 1 |
| D | 1.4 | 15 | 14 |
| D | 2.85 | 9 | 5 |
| D | 5.7 | 3 | 4 |
| D | 11.4 | 2 | 2 |

TABLE 1-continued

The lower yield points and gel strengths achievable by polymers B and C, of the invention, at equivalent dosages demonstrates the advantages of these polymers over the commercially utilised materials A and D.

A similar advantage is also obtainable when the pH of the fluid is adjusted to pH 11, this being a common mud condition and being typical for muds containing lignosulphonates. The corresponding values are given in Table 2 below.

TABLE 2

| Thinner | Dosage | YP | 10 Second Gel |
|---|---|---|---|
| None | 0 | 62 | 37 |
| A | 0.57 | 29 | 21 |
| A | 1.14 | 9 | 21 |
| A | 2.28 | 7 | 26 |
| B | 0.57 | 15 | 20 |
| B | 1.14 | 2 | 6 |
| B | 2.28 | 1 | 1 |
| C | 0.57 | 11 | 16 |
| C | 1.14 | 2 | 5 |
| C | 2.28 | 1 | 2 |
| D | 1.42 | 50 | 31 |
| D | 2.85 | 29 | 20 |
| D | 5.7 | 2 | 4 |
| D | 8.55 | 0 | 1 |

EXAMPLE 2

Muds formulated as in Example 1 were subject to aging for 16 hours at 232° C., cooled to room temperature and their physical condition examined for their relative degree of fluidity. The muds were then remixed by Hamilton Beach mixer for 5 minutes and their rheology measured by Fann viscometer Model 35SA. To further assess the effect of temperature cycling as would be experienced by mud cycling downhole, the viscosity of each mud sample was measured at 204° C. using a Fann Viscometer Model 50.

The results shown in Table 3 were observed. In these, the dosage is in grams per liter, the PV, YP and 10 second and 10 minute gel values are recorded on the Fann 35 data, PV being in cp and the YP and gel values being in Pa and the other viscosity values are all recorded in cp. IV is the initial viscosity in cp. FT is the floc temperature in °C. in which the viscosity reaches a minimum on heating. T40 is the temperature in °C. at which the viscosity reaches 40 cp on heating. Peak is the peak viscosity in cp and is usually reached prior to maximum temperature. MCV is the minimum viscosity at 65° C., this being the mud pit temperature. Muds show a tendency to gel after cooling, as shown by a steady rise in viscosity and comparison of V65 with V32, the viscosity at 32° C. in cp, is indicative of this.

The results show that B, including AMPS, is better than the acrylate A but that increasing the amount of AMPS, as in C, improves the measured results.

TABLE 3

| Product | Dosage | PV | YP | 10 Sec Gel | 10 Sec Gel | Aged pH | Condition After Aging | IV | FT | T40 | Peak | MCV | V65 | V32 |
| --- | --- | --- | --- | --- | --- | --- | --- | --- | --- | --- | --- | --- | --- | --- |
| Untreated | 0 | 14 | 46 | 34 | 35 | 7.9 | Gelled Solid | 315 | 73 | — | 400 | 25 | 75 | 122 |
| A | 0.28 | 17.5 | 13 | 7 | 18 | | Gelled Solid | | | | | | | |
| A | 0.85 | 40 | 43 | 17 | 37 | 8.6 | Gelled Solid | 255 | 148 | — | 147 | 143 | 179 | 228 |
| A | 1.43 | 25 | 21 | 8 | 25 | 8.3 | Gelled Solid | 143 | 129 | 69 | 85 | 33 | 33 | 80 |
| A | 2 | 31 | 81 | 54 | 58 | 7.6 | Gelled Solid | | | | | | | |
| A | 2.85 | 26 | 80 | 55 | 51 | | Gelled Solid | | | | | | | |
| B | 0.28 | 21 | 12 | 5 | 18 | 8.6 | Lumpy Fluid | 133 | 192 | — | 355 | 86 | 97 | 122 |
| B | 0.85 | 34.5 | 8 | 1 | 8 | 7.5 | Lumpy Fluid | 51 | 126 | 67 | 257 | 38 | 42 | 48 |
| B | 1.43 | 26 | 7 | 1 | 9 | 8.4 | Lumpy Fluid | 67 | 120 | 62 | 248 | 22 | 22 | 45 |
| B | 2 | 22 | 17 | 3 | 17 | 8.6 | Lumpy Fluid | 100 | 144 | 84 | 52 | 26 | 26 | 59 |
| B | 2.85 | 21 | 18 | 8 | 20 | 8.2 | | 118 | 122 | 69 | 74 | 18 | 18 | 72 |
| C | 0.85 | 29.5 | 3 | 1 | 1 | 8.8 | Fluid | 33 | 148 | 120 | 57 | 29 | 33 | 33 |
| C | 1.43 | 25.5 | 1 | 1 | 1 | 8.5 | Fluid | 27 | 120 | 73 | 102 | 17 | 22 | 18 |

EXAMPLE 3

A weighted freshwater mud at 1.45 specific gravity ($gcm^{-3}$) containing 71 g/l Wyoming bentonite and 20 barite was mixed and aged for 16 hours to pre-hydrate the clay. To this was added 17 g/l of a commercially available ferrochrome lignosulphonate and the pH then adjusted to 11. Where applicable, 6.8 g/l active dosage of additive was applied and the mud mixed for 30 minutes on a suitable mixer. The muds were aged for 16 hours at 93° C., cooled to room temperature and remixed for 5 minutes prior to making pH and rheology measurements (Fann 35SA data). The pH was readjusted to 11 and the muds again aged for 16 hours but at 232° C. After aging, the muds were retested as described above and API low temperature fluid loss measurements were obtained.

Various additives were tested. Additives B and C are in accordance with the invention, as in Example 1. Additives A and D are commercial additives, as in Example 1. Additive E is a commercially available copolymer of styrene sulphonic acid/maleic anhydride, presumably in accordance with U.S. Pat. No. 3,730,900.

The test is designed to show the effect of the thinners in resisting thickening and gelation due to drilling mud thermal ageing when the mud contains a ferrochrome lignosulphonate thinner and the additive is added to protect this thinner and to contribute to the thinning properties. The results are shown in Table 4.

TABLE 4

| Product | Temperature | pH | PV (cp) | YP (Pa) | AV (cp) | 10 Sec gel | 10 Min gel | Condition After Aging |
| --- | --- | --- | --- | --- | --- | --- | --- | --- |
| D | 93 | 9.2 | 38 | 0.5 | 38.5 | 2 | 3 | Fluid |
| | 232 | 8.3 | 81 | 26 | 107.5 | 6 | 16 | Solid |
| A | 93 | 9.2 | 36 | 1 | 37 | 3 | 3 | Fluid |
| | 232 | 8.3 | 90 | 31 | 122 | 6 | 10 | Fluid |
| E* | 93 | 8.7 | 37 | 1 | 38.5 | 3 | 3 | Fluid |
| | 232 | 8.2 | 94 | 45 | 140 | 7 | 11 | Solid |
| B | 93 | 9.3 | 36 | 1 | 37 | 2 | 2 | Fluid |
| | 232 | 8.2 | 76 | 17 | 94 | 4 | 6 | Fluid |
| C | 93 | 9.3 | 33 | 8 | 40 | 4 | 5 | Fluid |
| | 232 | 7.5 | 92 | 25 | 118 | 5 | 9 | Fluid |

These results clearly demonstrate the superiority of the products of the invention, B and C, and in particular show that the sytrene sulphonic acid/maleic anhydride copolymer is much less effective than the polymers defined in the invention.

EXAMPLE 3

Various muds were made using 25 parts bentonite, 220 parts barites, 4 part calcium sulphate, 2 parts calcium hydroxide and 0.5 parts of 40% aqueous sodium hydroxide, all parts being parts per barrel. Various amounts of different thinners were added.

Thinner F was sodium acrylate homopolymer having molecular weight about 3,500 and polydispersity 1.6.

Thinner G was 80:20 sodium acrylate:AMPS copolymer of molecular weight about 3,500 and polydispersity 1.5.

Thinner J was 12:88 sodium allyl sulphonate:sodium acrylate copolymer of molecular weight 3,310 and polydispersity 1.56.

Thinner K was 26:74 sodium allyl sulphonate:sodium arylate copolymer of molecular weight 2,099 and polydispersity 1.67.

When the yield point and gel strength were measured as in Example 1 for muds containing thinners G and J it was found that very similar results were obtained. When the shear strength was determined at rates of addition of 0.4, 1.2 and 2.0 parts per barrel active polymer it was found that thinners G, J and K consistently gave a very much higher shear strength than thinner A. For instance at 0.4 parts per barrel, the shear strengths were F 420, G 110, J 42 and K 33 and at 2 parts per barrel the shear strength for F was 320 and the shear strength for G, J and K was below 3 (LB. 100 $FT^{-2}$).

This demonstrates that sodium allyl sulphonate does, like AMPS, have very beneficial properties when included in a copolymer as a thinner.

EXAMPLE 5

Three polymers suitable for use in the invention were provided as follows.

Sample K - 10:90 AMPS sodium salt:sodium acrylate copolymer
Mw=3357, Mn=2086, PD=1.609

Sample L - 30:70 AMPS sodium salt:sodium acrylate copolymer

Mw=4185, Mn=2555, PD=1.638

Sample M - 60:40 AMPS sodium salt:sodium acrylate copolymer

Mw=4604, Mn=2791, PD=1.650

Sample N in accordance with Example 4A of U.S. Pat. No. 3,898,037 was formed from 70% AMPS sodium salt and 30% acrylamide as follows.

9 g of sodium hydroxide was dissolved in 350 g water and 46.5 g of 2-acrylamide-2-methylpropane sulphonic acid added. The mixture was stirred until the AMPS was completely dissolved and 21.4 g of acrylamide @100% was added followed by 150 ml of isopropanol. The solution was placed in a resin pot fitted with stirrer, condenser and nitrogen bubbler. The solution was purged with nitrogen for 30 minutes and heated to reflux @80° C. and 2 ml hydrogen peroxide (30%) added. After 2 hours at reflux an additional 2ml of hydrogen peroxide was added and heating maintained for a further 2½ hours. The nitrogen blanket was maintained throughout the experiment. On cooling a polymer was obtained having Dry Weight 13.6%.

The molecular weight was determined using apparatus that only measured values of up to about 8,000 and a significant fraction had not been measured. From this it was apparent that a significant fraction of the molecular weight was above 8,000, and it is believed that it ranged up to about 12,000. The apparatus recorded molecular weight values down to about 2,000. The polymer therefore had a very wide spread of molecular weights with a substantial fraction above 8,000. This indicates a polydispersity that is definitely well above 2 but it was not possible to measure a precise value because of the inability to measure the actual molecular weight distribution above 8,000.

12 ppg (pounds per U.S gallon) freshwater drilling fluids were formed by adding 25 ppb (pounds per barrel) bentonite-type clay together with sufficient barites to raise the density of the fluid to 12 ppg. 4 ppb gypsum, 1 ppb sodium chloride and 30 ppb drilled solids were incorporated. The muds were treated with 0.4 ppb active polymer of the following types and aged for 16 hours at 120° C., cooled and, retested by API methods. The results were as follows:

| Thinner | PV | YP | 10 sec gel |
| --- | --- | --- | --- |
| Sample K | 15 | 34 | 22 |
| Sample L | 16 | 28 | 18 |
| Sample M | 18 | 19 | 10 |
| Sample N | 13 | 42 | 37 |

This clearly demonstrates that samples K, L and M are very much better thinners than sample N, in accordance with U.S. Pat. No. 3,898,037, and this is due, at least in part, to the high polydispersity of sample N. It is also due to the fact that the amount of sulphonic monomer and the average molecular weight were both higher than is preferred for optimum results in freshwater muds.

EXAMPLE 6

A 20:80 sodium vinyl sulphonate/sodium acrylate copolymer was formed having Mw=3158, Mn=1649 and PD=1.914 and was labelled sample P.

The properties in drilling fluids of sample P was compared with samples A and B of Example 1 utilising a bentonite based weighted freshwater drilling fluid contaminated with 1 ppb NaCl and 4 ppb gypsum.

The mud samples were treated with 0.8 ppb active polymer of each type and their rheological properties were measured by API methods. The drilling mud samples were then aged at 120° C. for 16 hours and their prperties retested. The results were as follows.

| Thinner | Condition | PV | YP | 10 sec gel |
| --- | --- | --- | --- | --- |
| Sample P | Unaged | 14 | 5 | 6 |
| Sample P | Aged | 11 | 4 | 2 |
| Sample A | Unaged | 15 | 15 | 17 |
| Sample A | Aged | 20 | 9 | 11 |
| Sample B | Unaged | 12 | 6 | 15 |
| Sample B | Aged | 16 | 1 | 1 |

This clearly demonstrates that sodium vinyl sulphonic acid is a suitable sulphonated monomer to utilise in thinners of this invention.

We claim:

1. An aqueous fluid selected from drilling and packer fluids formed from fresh water and containing at least 25 g/l colloidal clay and, as thinner, an effective thinning amount of a water soluble polymer that has a viscosity of below 300 cps (Brookfield Viscometer, Model RVT, Spindle No. 1, speed 20 rpm 15% by weight active polymer solution at 20° C.) and a polydispersity below about 2.0 and molecular weight of from 1,000 to 8,000 and is formed from monomers consisting essentially of (a) 10 to 60% by weight ethylenically unsaturated monomer having a sulphonate group substituted on to an aliphatic carbon atom and (b) 40 to 90% by weight ethylenically unsaturated carboxylate selected from acrylate, methacrylate, itaconate and maleate, wherein the sulphonate and carboxylated groups are selected from free acid groups and water soluble salts thereof.

2. A fluid according to claim 1 containing 0.25 g/l dissolved calcium.

3. A fluid according to claim 1 in which the polymer has a molecular weight of from 2,000 to 4,500.

4. A fluid according to claim 1 in which the said polydispersity is below about 1.8.

5. A fluid according to claim 1 containing dispersed inorganic particulate material consisting essentially of particles selected from the group consisting of drilled rock particles and weighting agent.

6. A fluid according to claim 1 that is a copolymer of monomers consisting essentially of monomers a and b wherein monomer a is selected from allyl sulphonate wherein monomers a and b are selected from free acid monomers and water soluble salts thereof.

7. A fluid according to claim 1 in which the polymer is formed from monomers consisting essentially of acrylic acid and a sulphonic monomer selected from the group consisting of 2-acrylamido-2-methyl propane sulphonic acid and allyl sulphonic acid, wherein the monomers are in the form of free acid or ammonium or alkali metal salts thereof.

8. A fluid according to claim 11 in which the amount of monomer a is from 10 to 25% by weight and the amount of monomer b is from 90 to 75% by weight.

* * * * *